(12) United States Patent
Wichmann

(10) Patent No.: US 6,505,687 B1
(45) Date of Patent: Jan. 14, 2003

(54) ABRADING TINE FOR TURF AERATION APPARATUS

(76) Inventor: Paul Wichmann, R.R. 1 Box 401, Dent, MN (US) 56528

(*) Notice: Subject to any disclaimer, the term of this patent is extended or adjusted under 35 U.S.C. 154(b) by 0 days.

(21) Appl. No.: 09/524,457

(22) Filed: Mar. 10, 2000

(51) Int. Cl.$^7$ ............................................... A01B 45/02

(52) U.S. Cl. ................................. 172/22; D8/1; D8/13

(58) Field of Search ........................... 172/22, 21, 378, 172/371, 380, 379; D8/1, 13; 175/18, 20

(56) References Cited

U.S. PATENT DOCUMENTS

| | | | |
|---|---|---|---|
| 2,068,828 A | | 1/1937 | Tustain |
| 2,612,725 A | * | 10/1952 | Casey ........................... 172/22 |
| 2,638,831 A | | 5/1953 | Ferguson et al. |
| 2,800,066 A | | 7/1957 | Cohrs et al. |
| 3,057,093 A | * | 10/1962 | Gallo |
| D215,320 S | * | 9/1969 | Klayman |
| 3,538,533 A | * | 11/1970 | Woods |
| 3,738,060 A | * | 6/1973 | Jullien-Davin |
| 3,797,277 A | | 3/1974 | Killion et al. ................. 172/22 |
| 3,834,464 A | | 9/1974 | Carlson et al. ................ 172/22 |
| 3,856,109 A | | 12/1974 | Gates .......................... 182/84 |
| D239,820 S | * | 5/1976 | Retrum |
| 4,081,304 A | | 3/1978 | Bruseschi .................... 156/212 |
| 4,091,879 A | * | 5/1978 | Lomberk et al. ............ 172/373 |
| 4,252,200 A | * | 2/1981 | Peterson ...................... 175/20 |
| 4,574,890 A | | 3/1986 | Hansen et al. ................. 172/22 |
| 4,602,687 A | | 7/1986 | Hansen ......................... 172/22 |
| 4,638,867 A | | 1/1987 | Hansen et al. ................. 172/22 |
| 4,658,909 A | | 4/1987 | McDermott et al. .......... 172/22 |
| 4,750,565 A | | 6/1988 | Hansen et al. ................. 172/22 |
| 4,785,889 A | | 11/1988 | Killion ......................... 172/22 |

(List continued on next page.)

FOREIGN PATENT DOCUMENTS

DE     4219995 A1  *  12/1993

OTHER PUBLICATIONS

*A Modified Standard Aerification Corer: New Aid for Decreasing Soil Compaction in Turf*, Paul Wichmann, 30 pgs., 1998–99.
*Practical Turfgrass Management*, John H. Madison, D. Van Norstrand Company, 5 pgs., not dated.
*Effects of Traffic on Turfgrasses*, Robert N. Carrow, A. Martin Petrovic, Turfgrass, Agronomy No. 32, pgs. 285–317, 1992.
*The Effects of Vertical Operating Hollow Tine (VOHT) Cultivation on Turfgrass Soil Structure*, A. Martin Petrovic, A Dissertation, Michigan State University, 98 pgs., 1979.

Primary Examiner—Christopher J. Novosad
(74) Attorney, Agent, or Firm—Patterson, Thuente, Skaar & Christensen, P.A.

(57) ABSTRACT

An abrading tine for use with a turf aeration apparatus has abrading structure that is defined on and protrudes from an outer surface of the metal tube forming the tine. The abrading structure forms at least ten discrete protrusions per tine and such that a distance between a peak of each protrusion and the outer surface ranges between 1–12 mm. The abrading structure is defined such that a significant increase in water infiltration and root mass of the grass turf is achieved as compared to a conventional tine. The abrading tine is adapted to allow the proximal end of the tube to be operably coupled to the turf aeration apparatus by any number of known attachment arrangement. The tube may be slightly tapered and the distal end beveled for easier insertion into grass turf. The abrading structure can comprise a plurality of grating elements or a knurled pattern defined in the outer surface. In one embodiment, a metal sheet having grating elements comprised of apertures and corresponding raised structures is welded around the tube. In another embodiment, a knurled or threaded pattern is formed on the outer surface of the tube to create the abrading structure.

13 Claims, 5 Drawing Sheets

U.S. PATENT DOCUMENTS

| | | | | |
|---|---|---|---|---|
| 4,832,132 A | * | 5/1989 | Barcelon | 172/371 |
| 4,854,396 A | * | 8/1989 | Burch | 175/18 |
| 4,881,602 A | | 11/1989 | Hansen et al. | 172/22 |
| 4,884,637 A | | 12/1989 | Rohleder | 172/22 |
| 4,924,944 A | | 5/1990 | Cozine et al. | 172/22 |
| 5,207,278 A | | 5/1993 | Hatlen | 172/22 |
| 5,245,878 A | * | 9/1993 | Underwood | 175/20 X |
| 5,411,103 A | * | 5/1995 | Werner | 175/20 |
| 5,495,895 A | | 3/1996 | Sakamoto | 172/22 |
| 5,692,338 A | * | 12/1997 | Rose | 172/22 X |

* cited by examiner

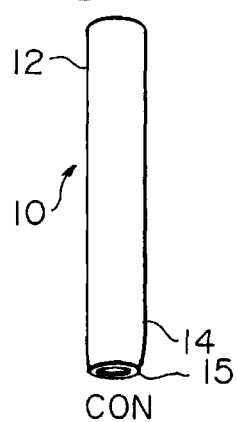
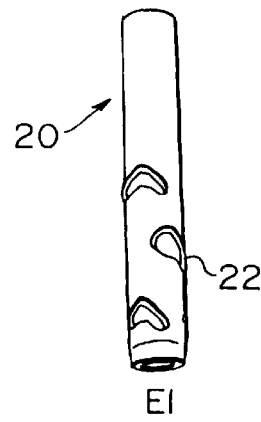
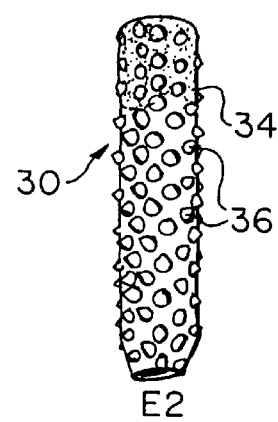
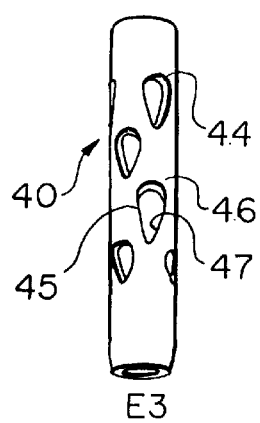
Fig. 1a  Fig. 2a  Fig. 3a  Fig. 4a
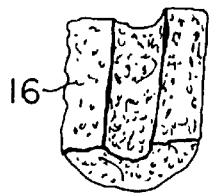
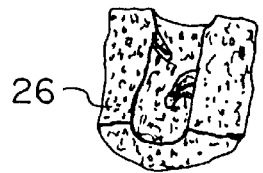
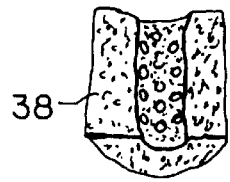
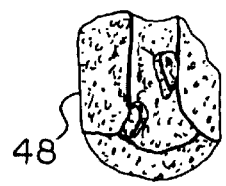
Fig. 1b  Fig. 2b  Fig. 3b  Fig. 4b
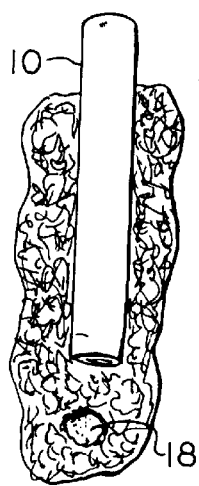
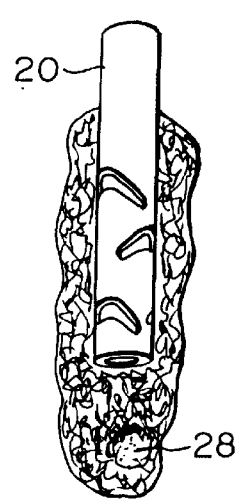
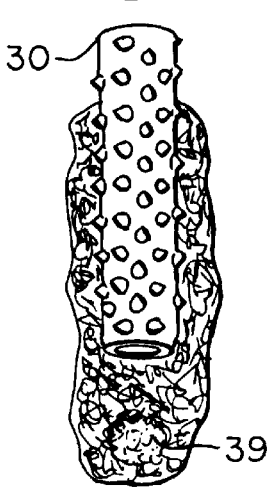
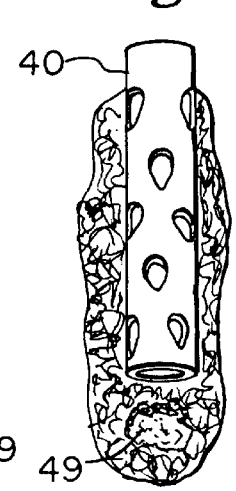
Fig. 1c  Fig. 2c  Fig. 3c  Fig. 4c

ABRADING TINE FOR TURF AERATION APPARATUS

FIELD OF THE INVENTION

The present invention relates generally to the field of earthwork and lawn aerator or perforator apparatus. More specifically, the present invention relates to an abrading tine for use with turf aeration apparatus that decreases the compaction of soil caused by conventional smooth tines and results in improved root mass and water infiltration.

BACKGROUND OF THE INVENTION

Soil compaction is the foremost turf problem, particularly for golf courses and athletic fields or other lawn areas subject to heavy traffic. Soil compaction occurs when soil particles are pressed together and pore spaces, or spaces between soil particles, are reduced. This reduction in pore space is detrimental as it impedes root growth, prevents oxygen from reaching the roots and, because water must flow through these pore spaces, a lack of these spaces means less water is available to the roots. Soil compaction also prevents root hair development and clipping yield is reduced. However, soil compaction does not directly deteriorate turf. Instead, it affects other factors such as soil aeration, soil strength, plant and soil moisture relationships, and soil temperatures. These factors, in turn, affect how turf grass grows.

Foot and vehicular traffic are the major causes of soil compaction. These types of compaction are most prevalent on high trafficked areas such as golf course greens where all golfers must converge in order to complete their respective holes. After a while, this compaction continues to build up and turf quality and vigor become seriously impaired.

The most widely used form of controlling soil compaction is cultivation. While it would not be practical to tear up the turf every time compaction problems arise, a selective tillage method called coring has been used as a satisfactory method of getting rid of compaction with minimal disturbance to the turf. Coring is achieved by taking a metal tube, called a tine or spoon, mounted on a crank shaft and vertically inserting it into the ground. The tines remove a small core of soil usually measuring about 10 cm in length and about 1 cm in diameter. Once the cores are removed, a topdressing usually consisting of sand is added in place of the cores. The topdressing improves infiltration, increases pore space, encourages root growth, and aids in the decomposition of thatch. Coring alone is also effective in releasing harmful gases that can build up in the soil. It improves wetting of dry soils, causes quicker drying of persistently wet soils, increases root development and shoot growth around the hole, and encourages turf grass response to fertilizers. If practiced regularly, core cultivation can be effective in alleviating many problems that affect turf grass growth.

Numerous types of turf aeration apparatus have been developed to accomplish the process of core cultivation. Examples of vertically powered devices can be found in U.S. Pat. Nos. 2,068,828, 2,638,831, 2,800,066, 3,834,464, 4,081,304, 4,602,687, 4,658,909, 4,750,565, 4,884,637 and 5,207,278. Most of these vertically powered turf aeration apparatus utilize a sharpened slightly tapered hollow metal tube as the tine that is vertically inserted and withdrawn from grass turf so as to extract a core. Other turf aeration apparatus use a V-shaped, U-shaped or X-shaped stake as the tine, although these devices may or may not extract a core. Solid tines may also be used in place of hollow tines. Other turf aeration apparatus use a barrel arrangement with the tines positioned around the barrel such that cores are created as the barrel is rolled over the grass turf. Still other turf aeration apparatus may use a drilling arrangement in which a bit is rotatably inserted into the grass turf and then withdrawn to produce a core; however, this arrangement is not preferred for treating larger areas of grass turf due to the lengthy time required to extract each core and the inability to easily create simultaneous cores using multiple tines.

Because of the continual wear that results from repeated insertion of the tines into the turf, it is necessary to frequently replace the tines. The shape of the tine is typically tapered and the surface of conventional tines is smooth so as to minimize the friction that results from repeated insertion of the tines into the turf. Many of the improvements in turf aeration apparatus have focused on the manner in which the tines are connected to the turf aeration apparatus so as to allow for more convenient replacement of the tines. Examples of these arrangements can be found in U.S. Pat. Nos. 4,574,890, 4,638,867, 4,785,889, 4,881,602 and 5,495,895.

Some improvements to the tines themselves also have been made. U.S Pat. No. 3,586,109 describes a hard wear-resistant ring element that fixed to the lower end of the tine and forms the portion of the tine that affects the cutting of said turf to improve durability. U.S. Pat. Nos. 3,797,577 and 4,924,944 describes tines having openings in a side of the tine for ejecting the core in a different manner than out the top or bottom of the tine.

While core cultivation is essential for maintaining turf quality, it does little to actually alleviate compaction. Removing a core of compacted soil and replacing it with sand will certainly reduce compaction, but this reduction in compaction only occurs in that hole. It has been found that when a tine is inserted into the ground, the force it takes to insert the tine causes pressure to be applied outward. (Petrovic 1979). Rather than reducing compaction around the core hole, the tine itself increases compaction to the base of the core and along the core wall. "The results to date are conflicting in that core cultivation has improved or had no effect on alleviating compaction and in several cases created more compaction (Waddington, et. al., 1992). It is also the case that any improvements in infiltration capacity due to core cultivation may last only a few weeks or a month. (Byrne, et. al., 1965).

Although core cultivation may not directly improve compaction, there has been a generally accepted belief that core cultivation serves a long-term benefit. "If holes are punched regularly on a monthly basis, compaction can be relieved in 6–10 years." (Madison 1971). Fortunately, there are also short-term benefits that make core cultivation worthwhile, such as stimulated root activity, release of toxic gases, and disruption of soil layers. When coupled with the short term improvements in infiltration capacity provided by core cultivation which also last about a month, it has become accepted practice in the turf management industry to recommend the use turf aeration apparatus to perform core cultivation on a monthly basis for high traffic areas such as golf greens and athletic fields.

Even though existing turf aeration apparatus are useful in enhancing the viability of turf grass in compacted areas, it would be desirable to develop an apparatus for core cultivation that not only decreased compaction in the aerified hole, but also decreased compaction around the hole. It would be advantageous if the use of this apparatus for core cultivation also retained infiltration effectiveness over a longer period of time without reducing the benefits of the conventional coring method. Most of all, in order to please the ever escalating demands of golfers and turf managers alike, the disturbance of the turf must be minimal after the application of such a new core cultivation technique.

SUMMARY OF THE INVENTION

The present invention is an abrading tine for use with a turf aeration apparatus. Preferably, the tine is a coring tine comprised of a hollow metal tube having a proximal end and a distal end. Abrading structure is defined on and protrudes from an outer surface of the tube such that the abrading structure forms at least ten discrete protrusions per tine and such that a distance between a peak of each protrusion and the outer surface ranges from greater than 1 mm to less than 12 mm. The abrading structure is defined such that a significant increase in water infiltration and root mass of the grass turf is achieved as compared to a conventional smooth tine. The abrading tine is adapted to allow the proximal end of the tube to be operably coupled to a vertically powered-turf aeration apparatus by any number of known attachment arrangement. The tube may be slightly tapered and the distal end beveled for easier insertion into grass turf. The abrading structure can comprise a plurality of grating elements or a knurled pattern defined in the outer surface. In one embodiment, a metal sheet having grating elements comprised of apertures and corresponding raised structures is welded around the tube. In another embodiment, a knurled or threaded pattern is formed on the outer surface of the tube to create the abrading structure.

Tests have confirmed that the abrading tine in accordance with the present invention will not only decrease soil compaction in the core hole, but also decrease compaction around the core hole. This improves water infiltration effectiveness for a longer period of time, and subsequently, increases root development without affecting the other benefits of the conventional turf aeration apparatus. Advantageously, the preferred embodiment of the present invention is able to lengthen typical water infiltration rates such that the frequency of turf aeration can be reduced by up to fifty percent. Similarly, root mass of grass turf treated in accordance with the present invention can also be increased by up to fifty percent.

BRIEF DESCRIPTION OF THE DRAWINGS

FIG. 1a is a perspective of a conventional smooth coring tine.

FIG. 1b is a cut-away perspective of a sample core produced by the tine of FIG. 1a.

FIG. 1c is a perspective of a sample hole in the turf produced by the tine of FIG. 1a.

FIG. 2a is a perspective of a prior art coring tine having a limited number of openings in the tubular tine.

FIG. 2b is a cut-away perspective of a sample core produced by the tine of FIG. 2a.

FIG. 2c is a perspective of a sample hole in the turf produced by the tine of FIG. 2a.

FIG. 3a is a perspective of one embodiment of the present invention.

FIG. 3b is a cut-away perspective of a sample core produced by the tine of FIG. 3a.

FIG. 3c is a perspective of a sample hole in the turf produced by the tine of FIG. 3a.

FIG. 4a is a perspective of an alternate embodiment of the present invention.

FIG. 4b is a cut-away perspective of a sample core produced by the tine of FIG. 4a.

FIG. 4c is a perspective of a sample hole in the turf produced by the tine of FIG. 4a.

FIG. 7 is a graph showing average infiltration rates comparing the tines of FIGS. 1a, 2a, 3a and 4a.

FIG. 8 is a graph showing the average bulk density per sample comparing the tines of FIGS. 1a, 2a, 3a and 4a.

FIG. 9 is a graph showing the root mass of turf samples treated with the tines of FIGS. 1a, 2a, 3a and 4a.

DETAILED DESCRIPTION OF THE PREFERRED EMBODIMENT

Figure 5:
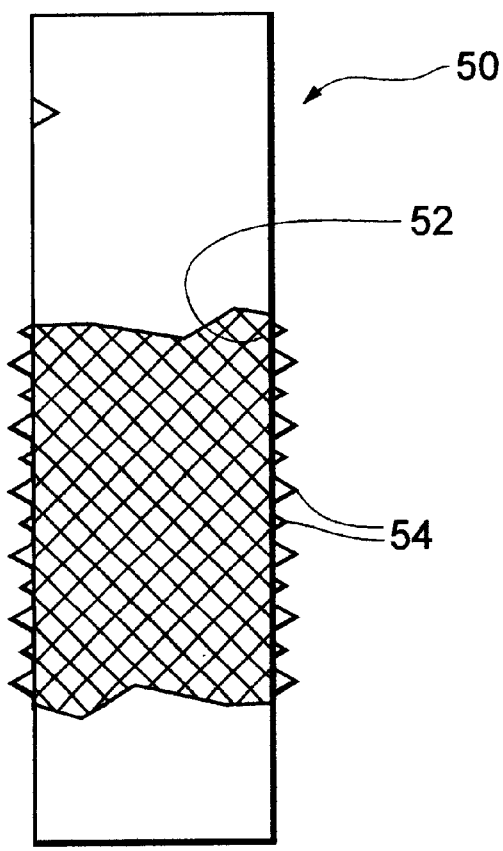
FIG. 5 is a perspective of another embodiment of the present invention.

Referring to FIG. 1a, a conventional smooth coring tine 10 is shown. Coring tine 10 is made of a metal tube and has a proximal end 12 which includes structure that is adapted to be operably connected to an associated turf aeration apparatus (not shown). Such structure may be threads for screwing the tine 10 into place, or a portion of the proximal end which mates with a set screw arrangement or a clamping arrangement in the turf aeration apparatus, or a particular connector that mates with an associated connector in the turf aeration apparatus. Various mechanisms for attaching a tine to a turf aeration apparatus are known in the art as discussed in the background section. A distal end 14 is preferably tapered and may also include a beveled cutting edge 15.

FIGS. 1b and 1c show a sample core hole 16 and turf hole 18 produced by the smooth coring tine 10. As can be seen, the interior wall of the sample core hole 16 is very smooth and exhibits a high degree of lateral compaction after insertion of the coring tine 10. The turf hole 18 has a very defined circular appearance with sharp edges.

FIG. 2a shows a prior art coring tine 20 identical to coring tine 10 except that a limited number of openings 22 have been made in the wall of tine 20. In this example, the openings 22 are six or seven slots cut into the wall of the tine 20. The bottom half of the openings 22 in this example were pried out somewhat, but they protrude less than 1 mm above the outer surface of the wall of the tine 20. The design of the prior art coring tine 20 is a previous work of the inventor and the concept behind the openings 22 was to create a fish hook like structure that would offer no resistance when inserted downward into the grass turf, but would tend to cut when withdrawn upward. An earlier work by the inventor along the same lines created a tine (not shown) by driving three or four spike through a copper tube such that the spike extended outward by at least 15 mm. This design provided impractical for purposes other than experimentation due to the increased power required to insert and retract the tine. Openings 22 in the tine are also present in non-tubular tines such as V-shaped or U-shaped tines where the tine is not a tubular member, but rather is formed of a bent metal bar. Other examples of openings 22 can be found in U.S. Pat. Nos. 3,797,577 and 4,924,944 in which the openings are used as an alternate path for ejecting a core.

FIGS. 2b and 2c show a sample core hole 26 and turf hole 28 produced by the coring tine 20. As can be seen, the interior wall of the sample core hole 26 is still substantially smooth, although not as smooth as the sample core hole 16. Similarly, the turf hole 28 is fairly well defined, although again it is not as defined as turf hole 18 and is also slightly larger.

FIG. 3a shows a first embodiment of an abrading coring tine 30 in accordance with the present invention. In this embodiment, an abrading structure 32 is comprised of a metal sheet 34 having protruding structures 36 defined on the metal sheet 34 that is wrapped around and secured to the hollow metal tube that forms coring tine 30. Preferably, the metal sheet 34 is welded to the metal tube, although other forms of attachment could be used provided they afforded sufficient strength to retain the metal sheet in place during the turf aeration process. As can be seen from this figure, the number of protrusions 36 is greater than fifty. Each protrusion has a peak height above the exterior surface of the metal tube that forms coring tine 30 that is approximately 2–3 mm.

FIGS. 3b and 3c show a sample core hole 38 and turf hole 39 produced by the abrading coring tine 30 of the present invention. As can be seen, the interior wall of the sample core hole 38 has been roughened to the point where the contour of the tube is no longer discernable in the cross section. Unlike the turf holes of the prior art tines, the turf hole 39 is larger with a much more ragged edge.

FIG. 4a shows a second embodiment of an abrading coring tine 40 in accordance with the present invention. As with abrading coring tine 30, the abrading structure 42 of coring tine 40 is created by wrapping a metal sheet 44 having a plurality of grating elements 45, each grating element 45 has structure defining an aperture 46 and a corresponding raised structure 47 having at least one cutting surface. In this embodiment, there are approximately fifteen grating elements 45 per tine with the raised structure 47 having a peak height of approximately 1–2 mm. A position of the aperture relative to the raised structure is selected from the set consisting of: the aperture 46 being positioned above the raised structure 47 relative to the grass turf, the aperture 46 being positioned below the raised structure 47, or the aperture 46 being positioned in the middle of the raised structure 47 (as shown in FIG. 3a, for example). Alternatively, a portion of the grating elements 45 may have the aperture 46 positioned above the raised structure 47 relative to the grass turf and another portion of the grating elements 45 may have the aperture 46 positioned below the raised structure 47 relative to the grass turf.

FIGS. 4b and 4c show a sample core hole 48 and a turf hole 49 produced by the abrading coring tine 40. As can be seen, the interior wall of the sample core hole 48 is not as rough as sample core hole 38 but is visibly more rough than sample core hole 26. The turf hole 49 is larger with rougher edges like turf hole 39.

Figure 6:
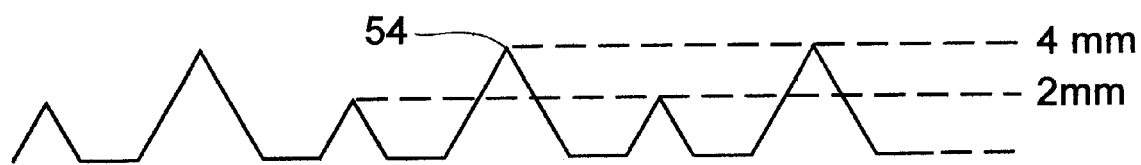
FIG. 6 is a detailed longitudinal cross section view of the embodiment shown in FIG. 5.

FIG. 5 shows a third embodiment of an abrading coring tine 50 in accordance with the present invention. In this embodiment, abrading structure 52 is knurled onto the surface of a metal tube to create a knurled pattern of protrusions 54, such as in the manner taught by U.S. Pat. No. 5,946,991. The peak height of each protrusion 54 is preferably between 3–5 mm. An alternating diamond pattern of protrusions 54 is preferred in which adjacent protrusions are of slightly different peak heights and/or shapes as shown in the detail of FIG. 6. It will be recognized that numerous random or repeating knurled patterns could be used in accordance with the present invention. The pattern of the abrading structure will need to be sufficiently robust such that the channels and valleys of the pattern do not become clogged with dirt, thereby defeating the purpose of the abrading surface. The details of such a pattern may also depend upon the type of soil being aerated as the average granular size of soil particle will differ among different types of soil.

Preferably, the abrading structure is designed to have a wear life that is consistent with the wear life of the cutting edge of the distal end of the tine. As tines have to be replaced frequently due to wear of the cutting edge, it is not necessary for the abrading structure to be more durable than the durability of the cutting edge. Such wear will obviously reduce the height of the protrusions during use so it may be advisable to design the initial height of the protrusions somewhat larger than the height at the end of life to still provide for the desired abrading result at the end of life of the tine. The height should not be higher than about 12 mm; however, as heights beyond this range tend to create protrusions that break off and that require increased power for the turf aeration apparatus to vertically insert and withdraw the tine.

Other embodiments of the abrading structure in accordance with the present invention are also contemplated. For example, the abrading structure could be formed by drilling through the wall of the metal tube forming the coring tine. Alternatively, the abrading structure could be formed by inserting protruding elements from inside the metal tube forming the coring tine to extend out beyond the outer surface. The abrading structure may also comprise a plurality of tabs chiseled into the outer surface of the tines or a plurality of molded protrusion produced by hot molding or cold stamping of the metal tube. Additional material could be added to the outer surface of the tines by welding or the like to form the discrete protrusions. It would also be possible to cut threads into the outer surface of the tines having a depth of greater than 1 mm. In this case, one revolution of a thread would be considered a discrete protrusion. Alternatively, it would be possible to longitundinally score the outer surface of the tines after the threads have been cut to break up the continuity of each revolution of a thread. While the preferred embodiment are described with respect to true tubular coring tines, it will be appreciated that the use of the abrading structure of the present invention is equally applicable to the outer surface of solid tines, as well as bent bar stock tines such as U-shaped, V-shaped and X-shaped non-hollow tines. It is also possible to direct the abrading structure of the present invention to relieve the compaction at the base of the hole. One possible design would be to add spikes on the bottom of the coring tine or to serrate the cutting edge at the distal end of the coring tine.

The experimental results of the abrading tines 30 and 40 of the present invention were experimentally compared with the prior art tines 10 and 20. During the summer, four test plots measuring 45 cm (1.5 ft.) by 60 cm (2 ft.) were laid out on an actual golf course green. Each plot was aerated differently. One plot served as the control and was aerated with the standard commercial tine 10. The second plot served as an experimental control and used tine 20 which was a prior experiment of the inventor. Since the focus of this experiment was to determine if an improved design would be better than the inventor's prior design, the second plot aerated with corer tine 10 also served as a control. The last two plots were aerated with the two new corer prototypes, abrading tines 30 and 40. The experimental green was watered every day along with the rest of the golf course for 90 minutes. The grass was also cut every day to a length of 6 mm (0.25 in.).

The four test tines 10, 20, 30 and 40 were constructed from actual commercial tines. Tine 20 was left as is to be used as the conventional control. Tine 20 was formed by using a metal cutting blade was used to make several angled incisions into the tine that served as the experimental control. The edge was then pushed outward by the use of a prying device, thus creating the slight outward protrusions.

The two experimental tines 30 and 40 were constructed in the same manner as each other, but their designs differed greatly. To create the coarse, textured surface needed to effectively disturb the soil around an aerified hole, a cheese grater was taken apart and the coarse, textured side was wrapped around the outside of a standard commercial aerator. The metal was than welded to the corer. The resulting tine 30 was than used to aerate the third test plot. To construct the second of the two tines 40, the same procedure was used. In this case however, the part of the cheese grater that was used closely resembled that of the experimental control in that instead of having a textured edge, it utilized outward protrusions. The difference between the design for tine 40 and the experimental control of tine 20 is that the outward protrusions of tine 40 are more uniform and they extend farther away from the side of the corer.

All four test plots were aerated with their respective tines. A grid pattern consisting of 5×5 cm squares was laid out on each plot. Aerification consisted of the removal of a core at each grid intersection by use of the appropriate tine. After aerification, seed and a topdressing of medium fine sand was added. The condition of the turf was observed daily.

A water infiltration test was conducted using an open ended plastic tube placed over aerified holes. Ten milliliters of water were added, and the time it took for the water to leave the tube was recorded. Water infiltration tests were conducted on a weekly basis at each of the four corners and in the middle of the plot. The infiltration time of 60 seconds which is the average for a compacted, nonaerated test sample was used as the standard to determine when a test sample had lost its effectiveness under continued build up of compaction. Infiltration tests were conducted every week until the time it took for the water to leave the tube had consistency reached an average time of 60 seconds. At this point, it was assumed that the sample had lost its infiltration effectiveness and the test was discontinued.

During the winter, tests were conducted in a laboratory. Pencross Bentgrass (*Agrostis palustris*) was grown in three sets of four polyethylene dishpans under artificial light. Each pan had holes drilled in the bottom for drainage and were watered regularly. The grass was cut to a height of 6 mm (0.25 in.), and the soil in the test pans was compacted to simulate the pedestrian traffic found on an average golf course green. The procedure for aerification was the same in the laboratory as in the field.

Infiltration experiments were conducted on the simulated dishpan "greens" in the same manner as they were conducted on the golf course green. The dishpans also proved useful in conducting root mass experiments. After a simulated "green" had lost its infiltration effectiveness, an appropriate chunk of sod was removed and dried. Equal amounts of sod measuring 5 cm wide by 5 cm long by 4 cm deep around a previously aerified core hole were extracted and the soil was carefully washed away. The root mass was thus determined.

To determine whether or not the experimental tines reduced compaction over the conventional tine 20 and the experimental control 30, bulk density experiments were conducted. The method of experimentation was modeled after that done by Petrovic (1979). Four clear plastic tubes measuring 5 cm in diameter and 20 cm in length were filled with compacted soil uninhabited by any plants. Each of the four tines was inserted into their respective soil filled tubes to simulate aerification. The soil around the previously aerified hole was extracted and subjected to overnight drying in a lab incubator at 70 degrees Celsius. This was done to rid the soil of moisture, and a more accurate measurement of bulk density attained. The dried soil was then weighed to determine its mass.

Finally, the last laboratory experiment observed root development by videotaping via mirror lowered into observation holes placed between the aerified hole and the surrounding soil. Data from all tests was tabulated and compared statistically using the t-test and analysis of variance (ANOVA).

Figure 7:
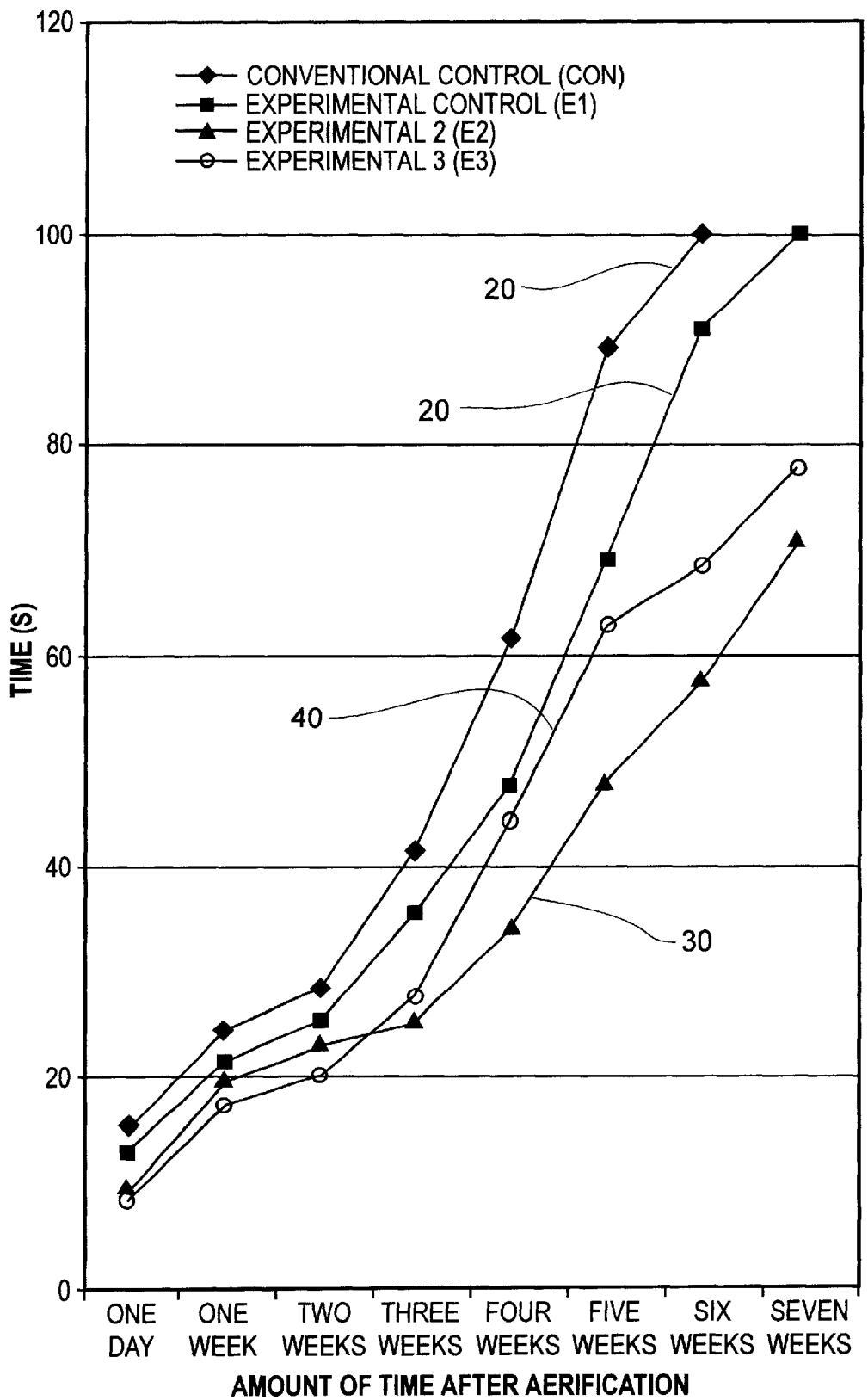

FIG. 7 shows the results of the water infiltration tests. 10 ml of water were poured into a plastic tube which was placed over previously aerified holes. The time it took for the soil to soak up the water in the tube was timed and compared. The results over seven weeks are shown in the graph.

Results tabulated by use of a t-test and analysis of variance ($p=0.05$) concluded that out of the three experimental tines tested, samples aerated with the tine that had a coarse textured, protruded surface significantly retained infiltration effectiveness twice as long and with a 46% increase in infiltration over the conventional control. Furthermore, the tine 40 with the coarse textured, protruded surface was found to be superior over the other two tines 30 and 50. In comparison, samples aerated by the tine 40 with the coarse textured, protruded surface maintained water infiltration effectiveness two weeks longer than samples aerated by either of the other two tines 30 and 50. In fact, the tine with the coarse textured, protruded surface showed a 37% significant increase in water infiltration over the experimental control. It should be noted that in order to simulate actual golf course green conditions, compaction was continually added during each two month period.

Figure 8:
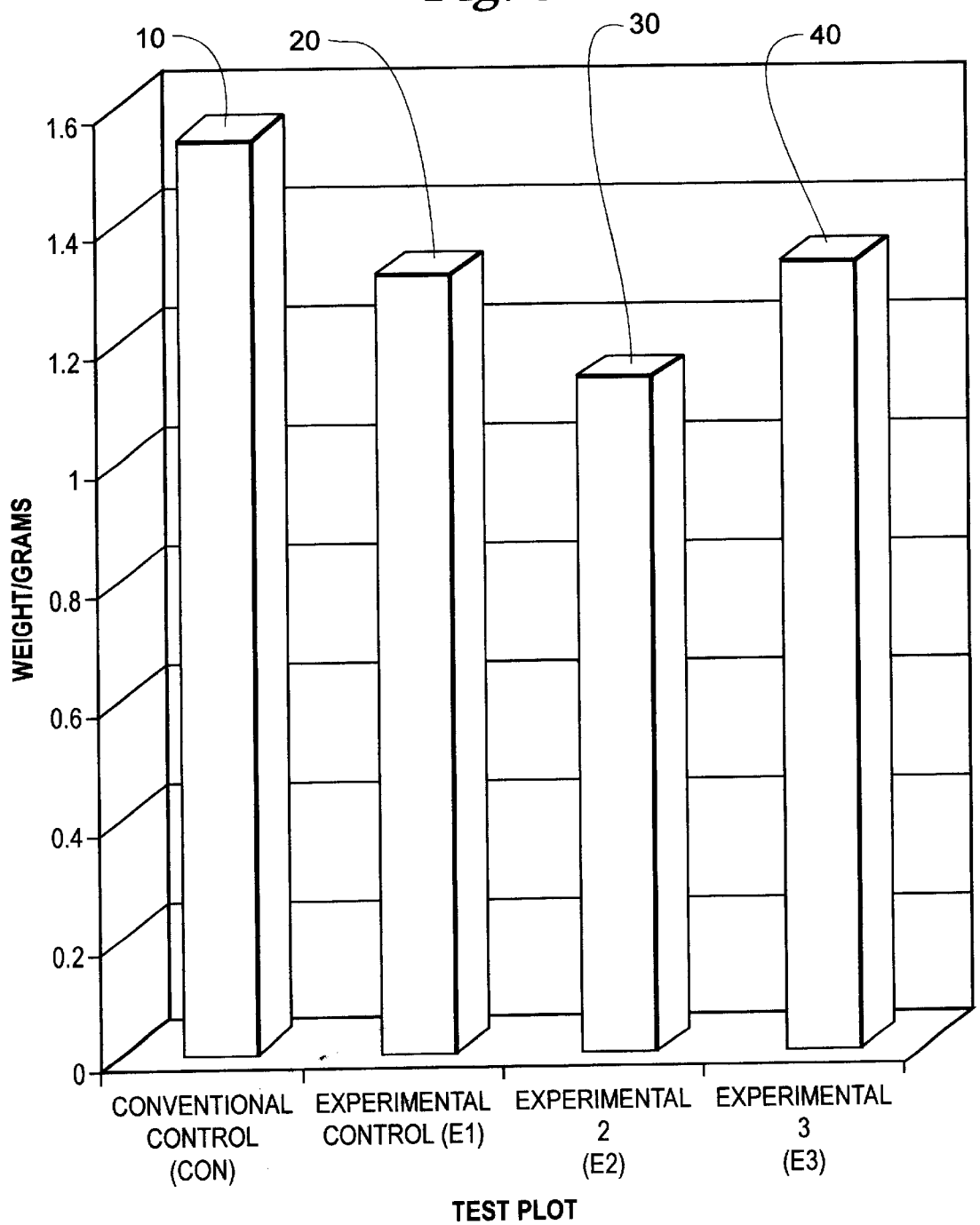

FIG. 8 shows the results of the bulk density experiments. The samples for this experiment were taken directly from the area most affected by aerification. In the bulk density experiments, all three tines 30, 40 and 50 showed a significant decrease in compaction over the conventional control 20. However, in comparing the bulk density values between the three tines 30, 40 and 50, only samples aerated by the tine 40 with the coarse textured, protruded surface showed a significant decrease in compaction over those aerated with the other two tines 30 and 50. A significant reduction in core wall compaction of 26% indicates that samples aerated by the tine 40 with the coarse textured, protruded surface have the least amount of core wall compaction compared to all other samples tested.

Figure 9:
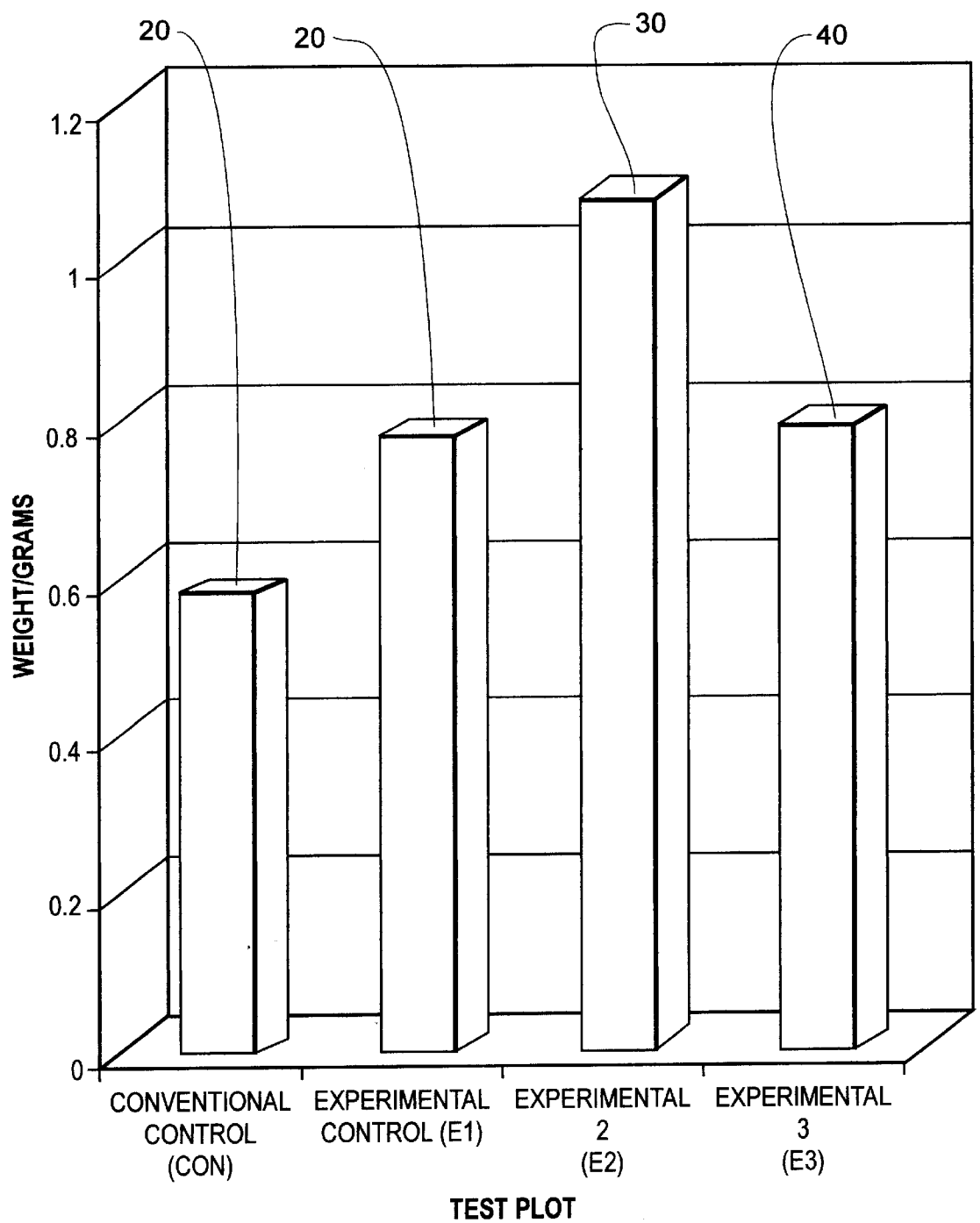

FIG. 9 shows the results of the root mass experiments. Root mass is the mass of the roots of a given core of soil. By comparing the masses of roots extracted from each test plot, it was discovered that samples aerated by the tine 40 with the coarse textured, protruded surface showed a significant increase of 47% in root mass over those samples aerated by the conventional control 20. This was the only such tine to have a significant difference over any of the other tines in root mass. While it did show a significant increase in root mass over the conventional control, a significant increase was not shown over either of the two tines 30 and 50. This may have been due to the lack of many repeated trials brought on by complications in experimentation.

Finally, there are no percentages or values for root development experiments consisting of a mirror placed into observation holes and the resultant reflection recorded on video tape as this experiment was conducted mainly for observatory reasons. Despite a few small complications, all experiments were executed successfully, and it was determined that of the four tines tested, the one with the coarse textured, protruded surface was the most successful in maintaining infiltration effectiveness, decreasing bulk density, and increasing root mass by decreasing soil compaction in all samples tested.

Although the preferred embodiment of the automated system of the present invention has been described, it will be recognized that numerous changes and variations can be made and that the scope of the present invention is to be defined by the claims.

What is claimed is:

1. A turf aeration apparatus having a plurality of tines that are inserted into grass turf wherein the improvement comprises:

each of the plurality of tines having abrading structure defined on and protruding from an outer surface of the tine, the outer surface of the tine being a side surface that is generally parallel to a longitudinal axis of the tine wherein the abrading structure forms at least ten discrete protrusions per tine and wherein a distance between a peak of each protrusion and the outer surface is greater than 1 mm and less than 12 mm such that a significant increase in water infiltration and root mass of the grass turf is achieved as compared to a conventional tine.

2. The apparatus of claim 1 wherein each of the tines has grooves formed in the outer surface with the discrete protrusions of the abrading structure being defined by peaks formed by the groves and the outer surface being defined by valleys formed by the grooves.

3. The apparatus of claim 1 wherein a distance between a peak of the abrading structure and the outer surface ranges between 2 mm and 5 mm.

4. A turf aeration apparatus having a plurality of tines that are inserted into grass turf wherein the improvement comprises:

each of the plurality of tines being a coring tine capable of removing a core of grass turf and having abrading structure defined on and protruding from an outer surface of the tine, the outer surface of the tine being a side surface that is generally parallel to a longitudinal axis of the tine wherein the abrading structure forms at least ten discrete protrusions per tine and wherein a distance between a peak of each protrusion and the outer surface is greater than 1 mm and less than 12 mm such that a significant increase in water infiltration and root mass of the grass turf is achieved as compared to a conventional tine.

5. The apparatus of claim 4 wherein each of the tines is comprised of a hollow metal tube.

6. The apparatus of claim 4 wherein each of the tines has grooves formed in the outer surface with the discrete protrusions of the abrading structure being defined by peaks formed by the grooves and the outer surface being defined by valleys formed by the grooves.

7. The apparatus of claim 4 wherein a distance between a peak of the abrading structure and the outer surface ranges between 2 mm and 5 mm.

8. A turf aeration apparatus having a plurality of tines that are inserted into grass turf wherein the improvement comprises:

each of the plurality of tines having abrading structure defined on and protruding from an outer surface of the tine wherein the abrading structure forms at least ten discrete protrusions per tine and wherein a distance between a peak of each protrusion and the outer surface is greater than 1 mm and less than 12 mm wherein each of the tines is comprised of a hollow metal tube and the abrading structure comprises a metal sheet having protruding structures defined on the metal sheet that is wrapped around and secured to the hollow metal tube such that a significant increase in water infiltration and root mass of the grass turf is achieved as compared to a conventional tine.

9. A turf aeration apparatus having a plurality of tines that are inserted into grass turf wherein the improvement comprises:

each of the plurality of tines having abrading structure defined on and protruding from an outer surface of the tine wherein the abrading structure forms at least ten discrete protrusions per tine and wherein a distance between a peak of each protrusion and the outer surface is greater than 1 mm and less than 12 mm wherein the abrading structure comprises a plurality of grating elements, each grating element having structure defining an aperture and a corresponding raised structure having at least one cutting surface such that a significant increase in water infiltration and root mass of the grass turf is achieved as compared to a conventional tine.

10. The apparatus of claim 9 wherein a position of the aperture relative to the raised structure is selected from the set consisting of: the aperture is positioned above the raised structure relative to the grass turf, the aperture is positioned below the raised structure relative to the grass turf, or the aperture is positioned in the middle of the raised structure.

11. The apparatus of claim 9 wherein a portion of the grating elements have the aperture positioned above the raised structure relative to the grass turf and another portion of the grating elements have the aperture positioned below the raised structure relative to the grass turf.

12. A turf aeration apparatus having a plurality of tines that are inserted into grass turf wherein the improvement comprises:

each of the plurality of tines having abrading structure defined on and protruding from an outer surface of the tine wherein the abrading structure forms at least ten discrete protrusions per tine and wherein a distance between a peak of each protrusion and the outer surface is greater than 1 mm and less than 12 mm wherein the abrading structure comprises a knurled pattern created on the outer surface of the tines such that a significant increase in water infiltration and root mass of the grass turf is achieved as compared to a conventional tine.

13. A turf aeration apparatus having a plurality of tines that are inserted into grass turf wherein the improvement comprises:

each of the plurality of tines having abrading structure defined on and protruding from an outer surface of the tine wherein the abrading structure forms at least ten discrete protrusions per tine and wherein a distance between a peak of each protrusion and the outer surface is greater than 1 mm and less than 12 mm wherein the abrading structure forms at least fifty discrete protrusions per tine such that a significant increase in water infiltration and root mass of the grass turf is achieved as compared to a conventional tine.

* * * * *